United States Patent
Wing

(10) Patent No.: US 7,483,393 B2
(45) Date of Patent: Jan. 27, 2009

(54) METHOD AND APPARATUS FOR DISCOVERING INTERNET ADDRESSES

(75) Inventor: Daniel G. Wing, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 728 days.

(21) Appl. No.: 11/007,073

(22) Filed: Dec. 7, 2004

(65) Prior Publication Data

US 2006/0120293 A1    Jun. 8, 2006

(51) Int. Cl.
H04L 12/28 (2006.01)
H04L 12/56 (2006.01)
G06F 15/16 (2006.01)

(52) U.S. Cl. .................... 370/254; 370/389; 370/401; 709/245

(58) Field of Classification Search .................. None
See application file for complete search history.

(56) References Cited

U.S. PATENT DOCUMENTS

| | | | | |
|---|---|---|---|---|
| 7,254,642 B2* | 8/2007 | Bhogal et al. | ............... | 709/245 |
| 2004/0139228 A1* | 7/2004 | Takeda et al. | ............... | 709/245 |
| 2004/0153502 A1* | 8/2004 | Jiang | ...................... | 709/203 |
| 2005/0114525 A1* | 5/2005 | Vimpari | ...................... | 709/228 |
| 2005/0286553 A1* | 12/2005 | Wetterwald et al. | ......... | 370/466 |
| 2006/0075127 A1* | 4/2006 | Juncker et al. | ............... | 709/229 |
| 2006/0209794 A1* | 9/2006 | Bae et al. | ...................... | 370/352 |
| 2007/0058642 A1* | 3/2007 | Eisink | ........................ | 370/401 |

OTHER PUBLICATIONS

Rosenberg, J. et al., "STUN—Simple Traversal of User Datagram Protocol (UDP) Through Network Address Translators (NATs)", IETF RFC 3489, Mar. 2003.
Rosenberg, J., "Interactive Connectivity Establishment (ICE): A Methodology for Network Address Translator (NAT) Traversal for Multimedia Session Establishment Protocols", IETF Draft, Jul. 19, 2004.

* cited by examiner

*Primary Examiner*—Gregory B Sefcheck
(74) *Attorney, Agent, or Firm*—Stolowitz Ford Cowger LLP

(57) ABSTRACT

Local address return services reduce the burden on central address return servers. A local client determines whether an intermediary Network Address Translator (NAT) resides between a local NAT and a public Internet network. The local address return service is enabled when no intermediary NAT resides between the local NAT and the public Internet network. The local address return service is disabled and the central address return service is used when an intermediary NAT resides between the local NAT and the public Internet network. In one embodiment, the local client is a Simple Traversal of User Datagram Protocol (UDP) Through Network Address Translators (NATS) (STUN) client and the local and central address return services are STUN servers.

30 Claims, 7 Drawing Sheets

BACKGROUND

METHOD AND APPARATUS FOR DISCOVERING INTERNET ADDRESSES

BACKGROUND

FIG. 1 shows a private network 15 that includes endpoint devices such as computers 16A and 16B and a Voice Over IP (VoIP) Internet phone 18. The devices 16A, 16B and 18 in the private network 15 are connected to the public Internet 14 through a Network Address Translator (NAT) 20 and modem 21. The public Internet 14 is also connected to other endpoint devices such as computer 24 and other Internet phones 26.

The NAT 20 is designed for Internet Protocol (IP) address simplification and conservation, by enabling the private IP network 15 to use non-registered IP addresses to connect to the public Internet 14. The NAT 20 operates as a router, usually connecting two networks together, and translates the private (not globally unique) addresses used in the private network 15 into legal public IP addresses before packets are forwarded onto public network 14. As part of this functionality, NAT 20 can be configured to advertise only one address for the entire private network 15 to the outside world.

In this example, the computers 16A and 16B, and phone 18, communicate over Internet network 14 using the public IP address 38 provided by the NAT 20. The NAT 20 receives a packet 30A from one of the connected devices, such as IP phone 18. The packet 30A includes a source address 32, destination address 34, and a payload 36. The NAT 20 reformats packet 30A into packet 30C by replacing the source address 32 with the NAT's public IP address 38 and a port number 40. The NAT 20 then forwards the reformatted packet 30C to an endpoint associated with the destination address 34, such as IP phone 26.

The IP phone 26 sends packets back to the IP phone 18 that include the IP address 38 and port number 40 for the NAT 20. The NAT 20 receives the packets and forwards the packets to the local private address 32 associated with IP phone 18.

The NAT 20 does not work until one of the private network devices 16A, 16B or 18 sends packets out to another device on the Internet 14. For example, IP phone 26 cannot connect to phone 18 until the private address 32 of phone 18 is first linked with the public IP address 38 and port number of NAT 20.

For this reason, the NAT 20 cannot be used with some IP applications. For example, IP peer-to-peer multimedia connections, such as those established in a VoIP call, include a signaling phase. During the signaling phase, the originating endpoint, such as IP phone 18, may need to send a public IP address and port number to a call signaling server, such as a Signal Initiation Protocol (SIP) or Quake server. However, the IP phone 18 does not know the public IP address 38 and port number used by the NAT 20.

Simple Traversal of User Datagram Protocol (UDP) Through Network Address Translators (NATS) (STUN) is an operation described in Request for Comment (RFC) 3489 which is herein incorporated by reference. A STUN server 22 enables an endpoint device to discover the public IP address and port number of the NAT 20. For example, the IP phone 18 can send an IP packet 30A to the STUN server 22. The NAT 20 again replaces the source address 32 with the public IP address 38 and port number 40 before forwarding the reformatted packet 30B to the STUN server 22.

The STUN server inserts the public NAT address 38 and port number 40 into the payload 44 of a return packet 30D and sends the return packet back to NAT 20. The NAT 20 then forwards the packet 30D back to the IP phone 18. The IP phone 18 can then use the IP address 38 and port number 40 in the payload 44 for VoIP signaling.

The devices 16A, 16B and 18 contact the public STUN server 22 for every new NAT binding, that is, for every phone call. This places a heavy reliance on the STUN server 22 and prevents STUN reliant applications from operating while the STUN server 22 is unavailable. For example, the phone 18 cannot make a VoIP call while STUN server 22 is down.

The present invention addresses this and other problems associated with the prior art.

SUMMARY OF THE INVENTION

Local address return services reduce the burden on central address return servers. A local client determines whether an intermediary Network Address Translator (NAT) resides between a local NAT and a public Internet network. The local address return service is enabled when no intermediary NAT resides between the local NAT and the public Internet network. The local address return service is disabled and the central address return service is used when an intermediary NAT resides between the local NAT and the public Internet network.

In one embodiment, the local client is a Simple Traversal of User Datagram Protocol (UDP) Through Network Address Translators (NATS) (STUN) client and the local and central address return services are STUN servers.

The foregoing and other objects, features and advantages of the invention will become more readily apparent from the following detailed description of a preferred embodiment of the invention which proceeds with reference to the accompanying drawings.

DETAILED DESCRIPTION

Figure 2:
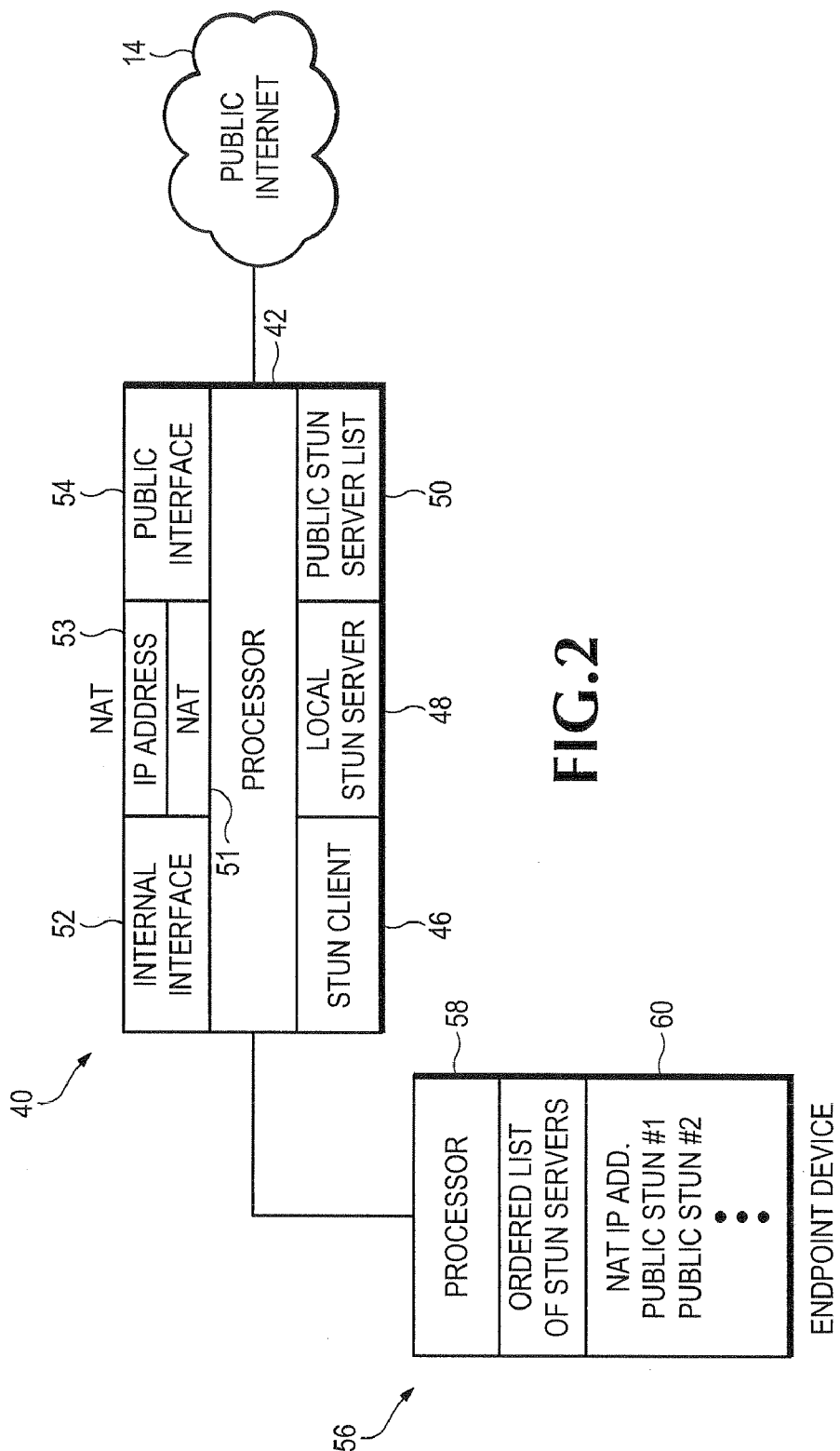
FIG. 2 is a block diagram showing a NAT that provides local STUN services.

FIG. 2 shows a Network Address Translator (NAT) device 40 that contains both a Simple Traversal of User Datagram Protocol (UDP) Through Network Address Translators (NATS) (STUN) client 46 and a STUN server 48. The NAT 40 includes memory configured with a list 50 of IP addresses for one or more public STUN servers. The list 50 can include anycast addresses for STUN servers. The local address return services described below are implemented using local and remote STUN servers. However, the operations described below can be used for any type of address return server or services or other address discover services.

A processor 42 in the NAT device 40 operates the STUN client 46, the STUN server 48 and a conventional NAT operation 51. An internal interface 52, such as a Local Area Network (LAN) interface connects to multiple endpoint devices 56. The internal interface 52 can be any wired or wireless connection that connects a computing device to the NAT device 40. For example, the internal interface 52 can also be a 802.11 wireless interface. A public interface 54 is connected either directly or indirectly to the public Internet network 14. The public interface can be for example a Digital Subscriber Loop (DSL) modem, Cable Modem, Ethernet, etc. or any other interface that communicates to any Wide Area Network (WAN) or Local Area Network (LAN) that makes up the public Internet network 14.

The endpoint devices 56 are any devices operating in a private network that are connected through NAT 40 to public internet 14. For example, the endpoint devices 56 can be IP phones, Personal Computers (PCs), or any other type of computing device that performs Internet applications. In one specific example, the endpoint device 56 may run Internet media applications that communicate using a Real-time Transport Protocol (RTP).

Figure 1:
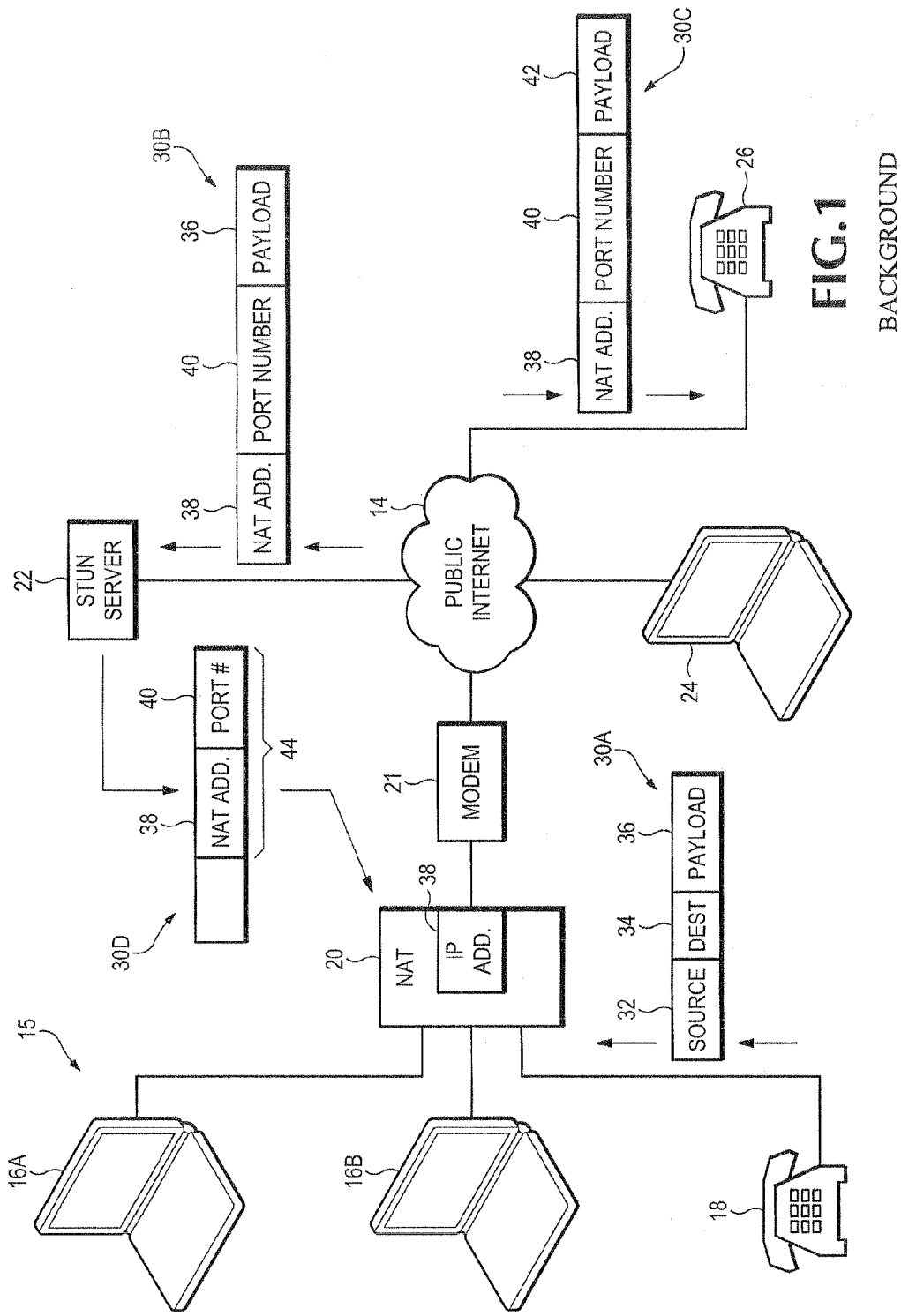
FIG. 1 is a diagram showing how a conventional NAT and STUN server operate.

The local STUN server 48 reduces the load on the public (central) STUN server 22 (FIG. 1). For example, the local STUN server 48 can be used to identify the IP addresses and port numbers assigned by NAT 51 to the endpoint devices 56. The STUN client 46 prevents the local STUN server 48 from being enabled when another intermediate NAT resides between the local NAT device 40 and the public Internet 14.

Figure 3:
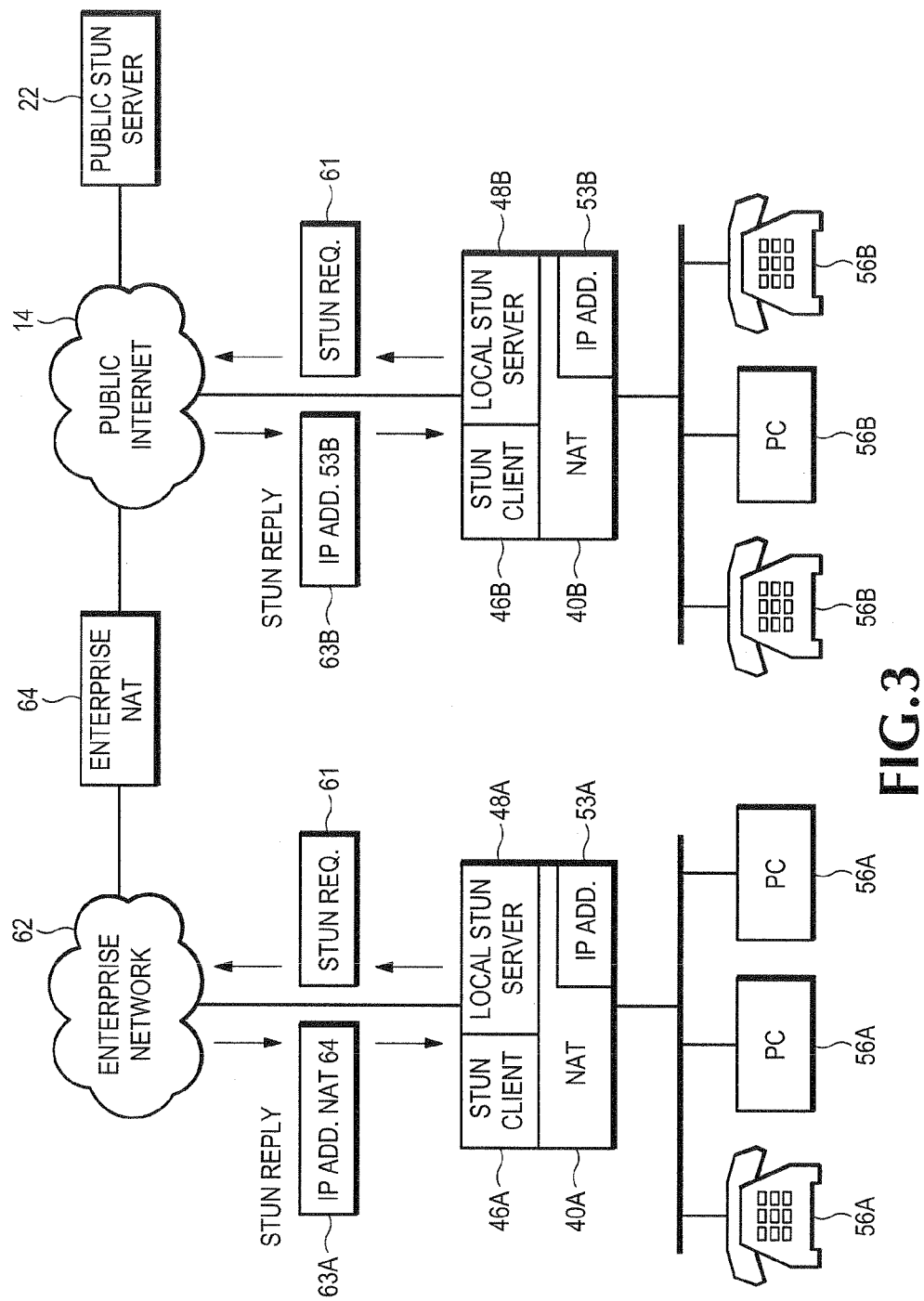
FIG. 3 is a diagram showing how the NAT in FIG. 2 operates.

To explain further, FIG. 3 shows two local NAT devices 40A and 40B that each include a STUN client 46 and a local STUN server 48. Each local NAT 40A and 40B is connected to one or more endpoint devices (STUN clients) 56 that may include IP phones, PCs, etc. The local NAT 40A is connected to an enterprise network 62 that is connected through an intermediate enterprise NAT 64 to the public portion of Internet 14. The NAT 40B is connected directly to the public Internet 14. A public STUN server 22 is also connected to the Internet 14.

Figure 4:
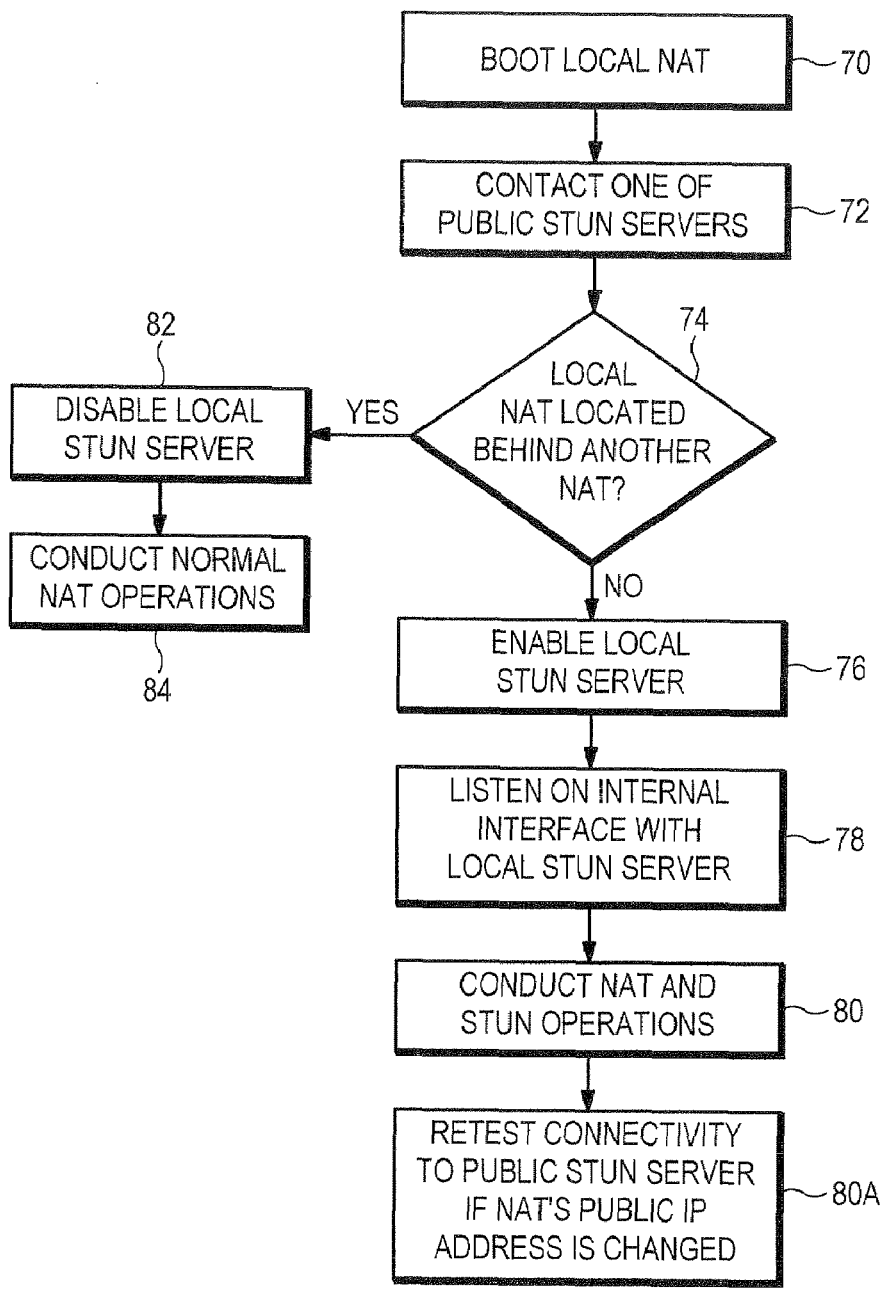
FIG. 4 is a flow diagram showing in more detail how the NAT in FIG. 2 operates.

FIG. 4 describes how the local NATs 40 in FIGS. 2 and 3 operate. The local NAT 40 boots up in block 70. In block 72, the STUN client 46 in the NAT 40 contacts one of the public STUN servers that are identified in the public STUN server list 50 (FIG. 2). The STUN client 46 contacts one of the public STUN servers, such as STUN server 22 in FIG. 3, to determine if local NAT 40 is located behind an intermediary NAT. For example, in FIG. 3, intermediary enterprise NAT 64 is located between local NAT 40A and public Internet 14. If the local NAT 40A is located behind another NAT in block 74, the local STUN server 48 is disabled in block 82. The local NAT 40 then conducts normal NAT operations in block 84. In other words, all STUN operations are conducted through public STUN server 22.

Alternatively, the local NAT 40 may be connected to the Internet 14 without connecting through another NAT device. For example, NAT device 40B in FIG. 3 is connected to Internet 14 without going through another NAT. If the local NAT 40 is not located behind another NAT in block 74, the local STUN server 48 in the local NAT 40 is enabled in block 76. In one embodiment depicted in block 78, the local STUN server 48 only listens on the internal interface 52 (FIG. 2) for STUN address service requests and not on the public interface 54 facing the Internet 14. This prevents the local STUN server 48 from being loaded down with STUN address requests from devices that are not part of the NAT's private network. If the NAT's public IP address is changed, the NAT will expect it is on a different network and will retest its connectivity to the public STUN server as depicted in block 80A.

Referring briefly back to FIG. 3, the STUN clients 46 in the local NATs 40 contact the public STUN server 22 in block 72 (FIG. 4) by sending a same STUN address request 61 that would normally be sent by one of the endpoint devices 56. For example, see the STUN request packet 30A in FIG. 1. The local NAT 40 determines if another NAT is connected between itself and the public Internet 14 by comparing the pubic IP address returned in the payload of STUN reply 63 with the address assigned to local NAT 40.

The STUN reply packet 63A sent to local NAT 40A will contain the IP address of intermediate NAT 64, since the intermediate NAT 64 uses its public IP address to send STUN request packet 61 to STUN server 22. The STUN reply packet 63B sent to local NAT 40B will contain the IP address 53B of local NAT 40B since there is no intermediate NAT to replace the IP address 53B.

The local NAT 40A compares the IP address in the STUN replay 63A with the local NAT IP address 53A. Since the IP address in the payload of STUN reply 63 is different from the local NAT IP address 53A, the local NAT 40A determines there is another NAT between itself and the Internet 14. Accordingly, the local STUN server 48A is disabled. The IP address in the payload of STUN reply 63B is the same as the local NAT IP address 53B. The local NAT 40B therefore determines no intermediate NAT exists between itself and the Internet 14. Accordingly, the local STUN server 48B is enabled.

Figure 5:
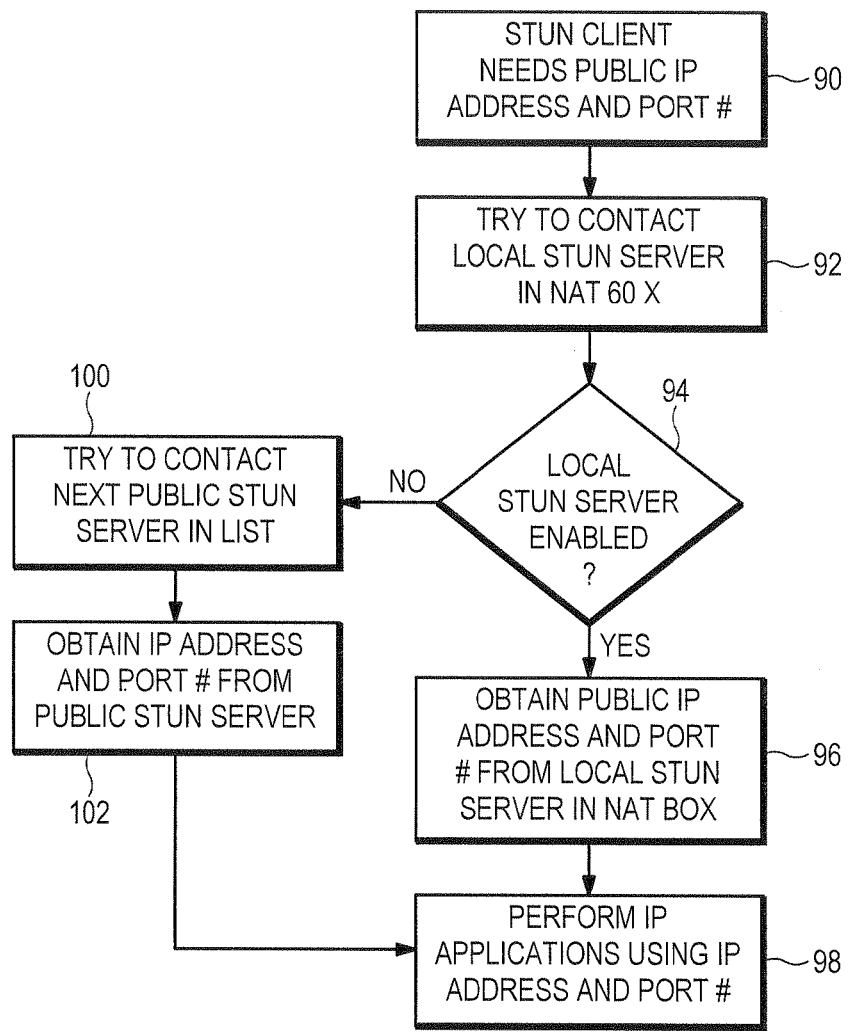
FIG. 5 is a flow diagram showing how a network device uses the NAT in FIG. 2.

FIG. 5 shows the operations performed by one of the endpoint devices, such as one of devices 56A or 56B in FIG. 3, when accessing the local and public STUN servers. The STUN client in the IP phone, Analog Telephone Adapter (ATA), PC, etc. is configured with an ordered list 60 (FIG. 2) of IP addresses for different STUN servers. At the top of the list 60 is the local IP address 53 (FIG. 3) for the local NAT box 40. In one instance, the local IP address 53 is the same as the default gateway returned in a Dynamic Host Configuration Protocol (DHCP) response when the STUN client in the endpoint device 56 boots.

In block 90, the STUN client in the endpoint device 56 determines it needs a public IP address and UDP port number. For example, for use during a signaling phase of an IP media transport session. The endpoint device 56 in block 92 first tries to contact the local STUN server 48 in the local NAT device 40.

As described above, the local STUN server 48 is enabled in block 94 when the local NAT 40B in FIG. 3 is connected directly to public Internet 14. Accordingly, in block 96, the endpoint device 56 uses the local STUN server 48 to obtain the IP address 53 for the local NAT box 40. The local STUN server 48 in the NAT box 40 interacts with the normal NAT operations 51 (FIG. 2) performed in the NAT box 40 to return a valid response to the endpoint device 56. The endpoint device 56 then performs IP applications using the identified IP address 53 of the local NAT 40.

Alternatively, the local STUN server 48 may be disabled. For example, when intermediary NAT 64 (FIG. 3) is connected between local NAT 40A and Internet 14. In this case the STUN client in endpoint device 56 immediately receives an ICMP error message while attempting to contact the local STUN server 48. If the ICMP error message is detected in block 94, the STUN client in block 100 attempts to contact the next STUN server identified in STUN server list 60 (FIG. 2). The STUN client in endpoint device 56 then performs normal STUN client operations as described in RFC 3489. For example the STUN client obtains the IP address and port number for NAT 64 from one of the public STUN servers 22 in block 102 and then uses the address to perform IP applications in block 98.

As an optimization, the STUN client may remove the address for local STUN server 48 from the list 60 of STUN address entries when an attempt to access the local STUN server 48 fails.

The STUN operations described above reduce the reliance on the public STUN server 22 and increases STUN availability and responsiveness by distributing STUN operations locally to private networks. For example, in the case where the local STUN server 48 is enabled, the public STUN server 22 only has to be in operation for the small amount of time required to confirm no intermediate NAT resides between the local NAT and the Internet 14. Thus, the load on the public STUN server 22 is reduced and the scalability and reliability of STUN operations is increased.

Figure 6:
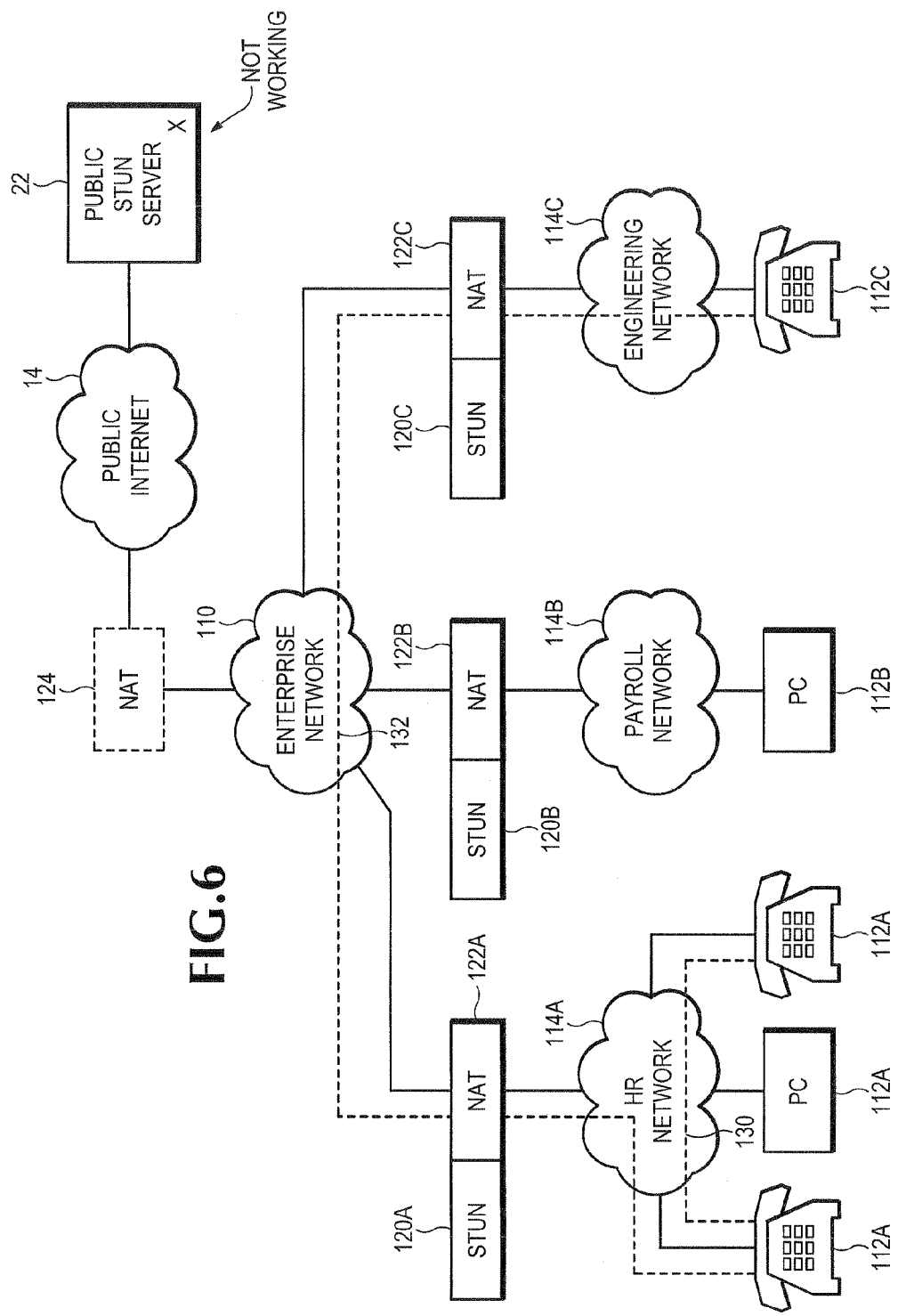
FIG. 6 is a block diagram showing another aspect of the distributed STUN services that maintains private network operations when central STUN services are unavailable.

FIG. 6 shows another characteristic of the STUN system that allows endpoint devices 112 in private networks to communicate even when a public STUN server 22 is not in operation. An enterprise network may include multiple different sub-networks, such as a Human Resources (HR) network 114A, payroll network 114B, and an engineering network 114C. This of course is just one example. Each sub-network 114 connects together different computing devices 112 that may include servers, PC's, ATA's, Internet phones, or any other type of network processing device.

The sub-networks 114 are connected together in the enterprise network 110 through NATs 122. Each NAT 122 includes the local STUN server and STUN client described above and are referred to generally as local STUN operations 120. The enterprise network 110 might be connected directly to the public internet 14 or connected through another intermediary NAT 124. One or more public STUN servers 22 are also connected to Internet 14.

As described above, some IP applications cannot work unless a public STUN server 22 is operational. The local STUN operations 120 provided in the local NATs 122 allow the endpoint devices 112 to communicate even when no public STUN server 22 is available. For example, two endpoint devices 112A can make an IP phone call over path 130 in sub-network 114A even when STUN server 22 is disabled. The IP phone 112A in sub-network 114A can also establish a phone call with an IP phone 112C in sub-network 114C over path 132 even when public STUN server 22 is down.

Figure 7:
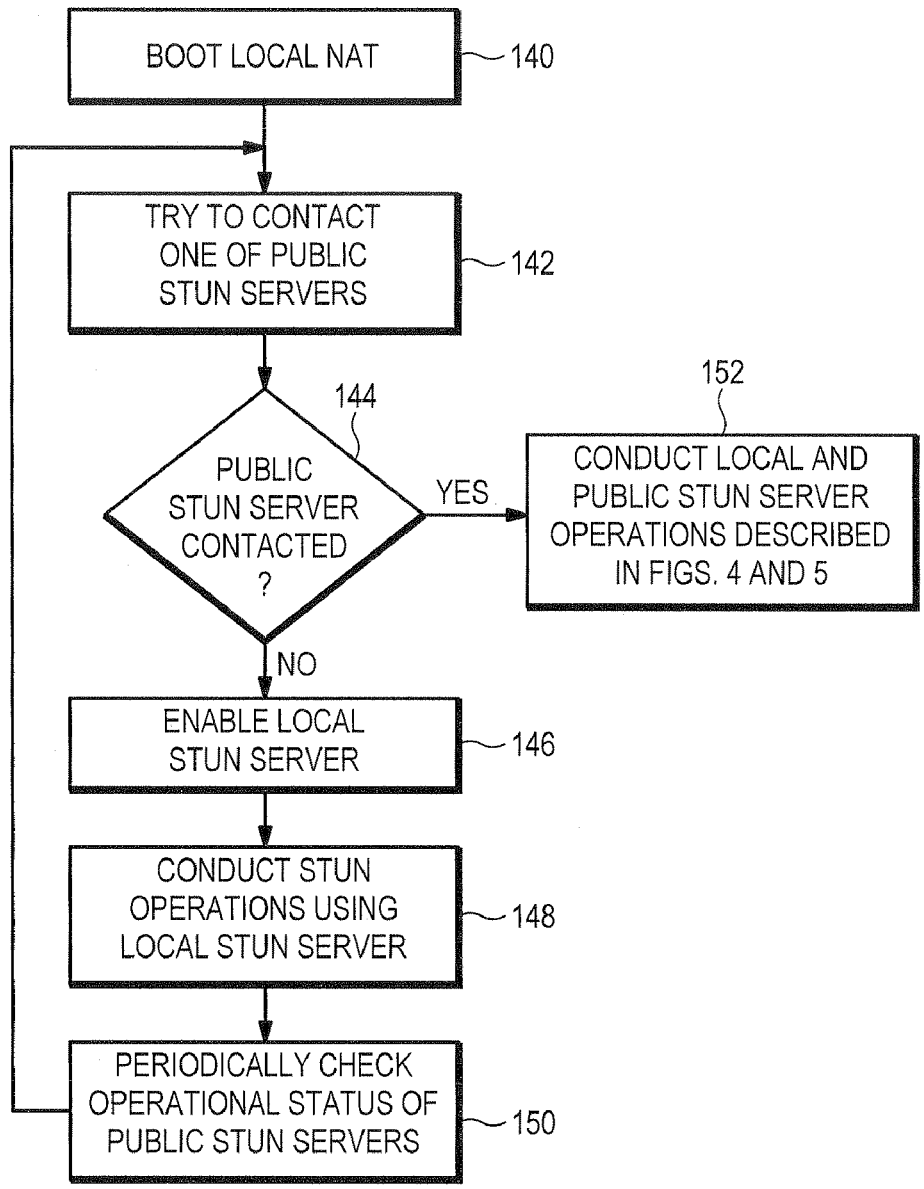
FIG. 7 is a flow diagram describing in more detail the STUN services shown in FIG. 6.

FIG. 7 describes in more detail how the local NATs 122 in FIG. 6 may operate to enable private network communications even when the public STUN server 22 is unavailable. The local NATs 122 boot in block 140. The STUN clients 46 (FIG. 2) in the local NATs 122 try to contact one of the public STUN servers 22 in block 142. If one of the public STUN servers 22 is contacted in block 144, then the STUN client 46 conducts the same local and public STUN server operations described above in FIGS. 4 and 5.

If none of the public STUN servers can be contacted in block 144, the local STUN server 48 is enabled in block 146. In block 148, the STUN operations for the private sub-networks 114 are handled locally by the local STUN servers 48. In block 150, the STUN clients 46 in the local NATs 122 may periodically check the operational status of the public STUN server 22.

If one of the public STUN servers 22 is contacted later in block 144, the local STUN server 48 is enabled or disabled in block 152 as described above in FIGS. 4 and 5. If the public STUN server remains unavailable in block 144, the local STUN server 48 continues to be used in block 148.

The STUN operations described above can be used in any residential or service provider-class products, such as an Analog Telephone Adapter (ATA), IP phones, Personal Computers (PCs) or home voice products. The STUN operations can also be incorporated into residential NATs and enterprise-class NATs The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operation in either hardware or software, or an article of machine-readable media containing instructions.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for discovering Internet Protocol (IP) addresses, comprising:
   determining whether an intermediary Network Address Translator (NAT) resides between a local NAT and a public Internet network;
   enabling a local address return service when no intermediary NAT resides between the local NAT and a public Internet network; and
   disabling the local address return service and using a remote address return service when the intermediary NAT resides between the local NAT and a public Internet network.

2. The method according to claim 1 including:
   sending a packet through the local NAT to the remote address return service;
   enabling the local address return service when a returned IP address from the remote address return service matches an IP address assigned to the local NAT; and
   disabling the local address return service and using the remote address return service when the returned IP address does not match the IP address assigned to the local NAT.

3. The method according to claim 1 including using Simple Traversal of User Datagram Protocol (UDP) Through Network Address Translators (NATS) (STUN) servers for both the local address return service and the remote address return service.

4. The method according to claim 3 including operating a STUN client in the local NAT to determine whether the intermediary NAT resides between the local NAT and the public Internet network.

5. The method according to claim 4 including using the local STUN server to listen for address return requests over an internal private interface in the local NAT and not listening for address return requests over a public interface in the local NAT.

6. The method according to claim 1 including:
   using the local address return service to identify an IP address and port number for the local NAT when the local address return service is enabled; and using the remote address return service to identify an IP address and port number for the intermediary NAT when the local address return service is disabled.

7. The method according to claim 1 including:
trying to contact one or more public address return services;
enabling the local address return service when none of the public address return services are available;
trying periodically to re-contact the one or more public address return services; and
disabling the local address return service and using one of the public address return services when one of the public address return services is contacted and the intermediary NAT resides between the local NAT and the public Internet network.

8. A network processing device, comprising:
a processor operating a client that determines whether the network processing device operates within a public network or operates within a private network, the processor enabling or disabling a local address discovery service depending upon whether the network processing device operates within the public network or within the private network, wherein the processor enables the local address discovery service when a remote address discovery service cannot be contacted and conducts address discovery operations for endpoints on the private network until the remote address discovery service becomes available.

9. The network processing device according to claim 8 wherein the processor operates a Network Address Translator (NAT) that receives Internet Protocol (IP) packets from endpoints, reformats the IP packets with an IP address and User Datagram Protocol (UDP) port number associated with the NAT, and sends the reformatted packets to the local address discovery service when the NAT operates within the public network.

10. A network processing device according to claim 9 wherein the STUN service, the STUN client, and the NAT all reside within the network processing device.

11. The network processing device according to claim 8 including an internal interface for connecting to the private network and a public interface for connecting directly or indirectly to the public network.

12. The network processing device according to claim 11 wherein the local address discovery service only listens for address discovery requests through the internal interface.

13. The network processing device according to claim 8 wherein the local address discovery service is a Simple Traversal of User Datagram Protocol (UDP) Through Network Address Translators (NATS) (STUN) service and the client operating in the network processing device is a STUN client.

14. A network device, comprising:
memory storing a list of address locations for address discovery devices used for identifying addresses for Network Address Translators (NATs); and
a processor using a remote address discovery device to discover the address for an intermediate NAT when the intermediate NAT resides between a local NAT and a public network and using a local address discovery device to discover the address for the local NAT when no intermediate NAT resides between the local NAT and the public network.

15. The network device according to claim 14 wherein the processor first attempts to access the local address discovery device and then uses the remote address discovery device when the local address discovery device is disabled.

16. The network device according to claim 14 wherein the processor conducts Internet Protocol (IP) phone calls over a local private network using the local NAT address identified by the local address discovery device when no remote address discovery devices can be contacted.

17. The network device according to claim 16 wherein the local and remote address discovery device are Simple Traversal of User Datagram Protocol (UDP) Through Network Address Translators (NATS) (STUN) servers.

18. The network device according to claim 14 wherein the processor sends a packet out to a selected one of the local or remote address discovery devices and receives back a reply packet that identifies a public address and port number associated with the local NAT or intermediate NAT that connects the network device to the public network.

19. A method for discovering an Internet Protocol (IP) address, comprising:
sending an inquiry through a local Network Address Translator (NAT) first to a local address return server to identify a public address for the local NAT; and
alternatively sending the inquiry through a remote NAT to a remote address return server to identify a public address for the remote NAT when the remote NAT is located between the local NAT and a public network.

20. The method according to claim 19 including sending the inquiry to the remote address return server whenever the local address return server is disabled.

21. The method according to claim 19 including:
attempting to contact one or more remote address return servers operating on the public network;
sending an inquiry to the local address return server for the IP address of the local NAT when none of the remote address return servers can be contacted; and
using the IP address of the local NAT to conduct IP communications over a private network when the remote address servers cannot be contacted.

22. The method according to claim 19 including using Simple Traversal of User Datagram Protocol (UDP) Through Network Address Translators (NATS) (STUN) servers for the local and remote address return servers.

23. A system for discovering an Internet Protocol (IP) address, comprising:
means for sending an inquiry through a local Network Address Translator (NAT) first to a local address return server to identify a public address for the local NAT; and
means for alternatively sending the inquiry through a remote NAT to a remote address return server to identify a public address for the remote NAT when the remote NAT is located between the local NAT and a public network.

24. The system according to claim 23 including means for sending the inquiry to the remote address return server whenever the local address return server is disabled.

25. The system according to claim 23 including:
means for attempting to contact one or more remote address return servers operating on the public network;
means for sending an inquiry to the local address return server for the IP address of the local NAT when none of the remote address return servers can be contacted; and
means for using the IP address of the local NAT to conduct IP communications over a private network when the remote address servers cannot be contacted.

26. The system according to claim 23 including means for using Simple Traversal of User Datagram Protocol (UDP) Through Network Address Translators (NATS) (STUN) servers for the local and remote address return servers.

27. An article of machine-readable media containing instructions for discovering an Internet Protocol (IP) address, the instructions when executed:

sending an inquiry through a local Network Address Translator (NAT) first to a local address return server to identify a public address for the local NAT; and alternatively sending the inquiry through a remote NAT to a remote address return server to identify a public address for the remote NAT when the remote NAT is located between the local NAT and a public network.

28. The article of machine-readable media according to claim 27 including instructions when executed sending the inquiry to the remote address return server whenever the local address return server is disabled.

29. The article of machine-readable media according to claim 28 including instructions when executed:

attempting to contact one or more remote address return servers operating on the public network;

sending an inquiry to the local address return server for the IP address of the local NAT when none of the remote address return servers can be contacted; and using the IP address of the local NAT to conduct IP communications over a private network when the remote address servers cannot be contacted.

30. The article of machine-readable media according to claim 27 including instructions when executed using Simple Traversal of User Datagram Protocol (UDP) Through Network Address Translators (NATS) (STUN) servers for the local and remote address return servers.

* * * * *